US011144629B2

(12) United States Patent
Maaroufi et al.

(10) Patent No.: US 11,144,629 B2
(45) Date of Patent: Oct. 12, 2021

(54) POINT AND CLICK AUTHENTICATION

(71) Applicant: Amadeus S.A.S., Biot (FR)

(72) Inventors: Mohamed-Amine Maaroufi, Antibes (FR); Florent Maupay, Antibes (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 16/653,350

(22) Filed: Oct. 15, 2019

(65) Prior Publication Data

US 2020/0134160 A1 Apr. 30, 2020

(30) Foreign Application Priority Data

Oct. 24, 2018 (FR) ........................................ 1859828

(51) Int. Cl.
*G06F 21/36* (2013.01)
*G06F 21/45* (2013.01)

(52) U.S. Cl.
CPC .............. *G06F 21/36* (2013.01); *G06F 21/45* (2013.01); *G06F 2221/2133* (2013.01)

(58) Field of Classification Search
CPC ... G06F 21/36; G06F 21/45; G06F 2221/2133
(Continued)

(56) References Cited

U.S. PATENT DOCUMENTS

| 6,209,104 | B1 * | 3/2001 | Jalili | ....................... | G06F 21/36 726/18 |
| 8,700,066 | B1 * | 4/2014 | Buchhop | ................ | H04W 4/02 455/456.3 |

(Continued)

FOREIGN PATENT DOCUMENTS

| JP | 2016110411 A * | 6/2016 | .............. G06F 11/30 |
| WO | 2007070014 A1 | 6/2007 | |
| WO | WO-2007070014 A1 * | 6/2007 | .............. G06F 21/36 |

OTHER PUBLICATIONS

Larkin, Henry. "Issues in Programmatically Designing User Interfaces in JavaScript." In Proceedings of the 12th International Conference on Advances in Mobile Computing and Multimedia, pp. 72-76. 2014. (Year: 2014).*

(Continued)

*Primary Examiner* — Luu T Pham
*Assistant Examiner* — Walter J Malinowski
(74) *Attorney, Agent, or Firm* — Thompson Hine LLP

(57) ABSTRACT

Systems and methods for multi-factor authentication using graphical passwords. An access request that includes an identifier and which identifies a protected resource is received from a client device. An interface is generated having a plurality of graphical objects for presentation at random locations on a display of the client device as defined by an object map. The plurality of graphical objects include a null object and a set of user-defined objects associated with the identifier that define a graphical password. Input data including an input event for each detected interaction with the interface is received. Each input event identifies a position on the display at which a corresponding interaction was detected. Using the object map, it is determined that the input data satisfies the graphical password. Access to the protected resource is granted in response to determining that the input data satisfies the graphical password.

17 Claims, 9 Drawing Sheets

(58) Field of Classification Search
USPC .......................................................... 726/17
See application file for complete search history.

(56) References Cited

U.S. PATENT DOCUMENTS

| | | | | |
|---|---|---|---|---|
| 8,966,587 B2* | 2/2015 | Nair | .................... | H04L 63/0815 726/4 |
| 10,678,906 B1* | 6/2020 | Loladia | ................... | G06F 21/45 |
| 10,754,814 B1* | 8/2020 | Li | .......................... | H04L 29/06 |
| 2002/0087892 A1* | 7/2002 | Imazu | .................. | H04L 63/083 726/6 |
| 2003/0103653 A1* | 6/2003 | Avni | ....................... | G06F 21/36 382/119 |
| 2004/0030934 A1* | 2/2004 | Mizoguchi | .............. | G06F 21/36 726/18 |
| 2004/0093527 A1* | 5/2004 | Pering | ..................... | G06F 21/36 726/5 |
| 2004/0230843 A1* | 11/2004 | Jansen | .................... | G06F 21/36 726/7 |
| 2007/0130618 A1* | 6/2007 | Chen | ....................... | G06F 21/36 726/8 |
| 2008/0045234 A1* | 2/2008 | Reed | ....................... | H04W 8/02 455/456.1 |
| 2008/0168403 A1* | 7/2008 | Westerman | ............. | G06F 3/041 715/863 |
| 2009/0089069 A1* | 4/2009 | McKibbon | ........... | H04L 67/125 705/317 |
| 2009/0293119 A1* | 11/2009 | Jonsson | .................. | G06F 21/36 726/19 |
| 2009/0320124 A1* | 12/2009 | Taxier | ..................... | G06F 21/36 726/17 |
| 2010/0037306 A1* | 2/2010 | Jan | .......................... | G06F 21/36 726/7 |
| 2010/0058437 A1* | 3/2010 | Liew | ....................... | G06F 21/36 726/2 |
| 2010/0189251 A1* | 7/2010 | Curren | ................. | G06F 21/6227 380/28 |
| 2011/0029721 A1* | 2/2011 | Yu | ........................... | G06F 21/79 711/103 |
| 2011/0093900 A1* | 4/2011 | Patel | .................. | H04N 21/2343 725/54 |
| 2011/0154482 A1* | 6/2011 | Heiner | ..................... | H04L 9/32 726/19 |
| 2012/0005735 A1* | 1/2012 | Prasanna | ................. | H04L 9/321 726/7 |
| 2012/0169856 A1* | 7/2012 | Ahmed | .................. | G06Q 10/08 348/61 |
| 2012/0192268 A1* | 7/2012 | Wang | ...................... | G06F 21/36 726/19 |
| 2013/0036462 A1* | 2/2013 | Krishnamurthi | ........ | G06F 21/31 726/19 |
| 2013/0139248 A1* | 5/2013 | Rhee | ................... | G06F 3/04883 726/19 |
| 2013/0263288 A1* | 10/2013 | Palanichamy | ........ | G06F 3/1454 726/30 |
| 2014/0114973 A1* | 4/2014 | Wetherell | ............ | G06F 3/04817 707/737 |
| 2014/0130148 A1* | 5/2014 | Sako | ....................... | G06F 21/36 726/19 |
| 2014/0282979 A1* | 9/2014 | Andon | .................. | H04L 63/083 726/7 |
| 2015/0169886 A1* | 6/2015 | Bhagwan | ............ | G06F 21/6254 726/26 |
| 2015/0178490 A1* | 6/2015 | Tamboly | .................. | G06F 21/46 726/4 |
| 2016/0005229 A1* | 1/2016 | Lee | ........................ | G06F 3/0488 345/419 |
| 2016/0088666 A1* | 3/2016 | Paterour | ............... | H04W 12/08 370/329 |
| 2017/0032111 A1* | 2/2017 | Johansson | ........... | H04L 63/0884 |
| 2017/0300686 A1* | 10/2017 | Shyu | ................... | G06K 9/00604 |
| 2018/0096417 A1* | 4/2018 | Cook | .................... | G06F 16/953 |
| 2018/0264337 A1* | 9/2018 | Logan | .................. | A63B 71/148 |
| 2018/0349345 A1* | 12/2018 | Walkup | ................. | G06F 40/177 |
| 2018/0365397 A1* | 12/2018 | Viscarola | ................ | G06F 21/44 |
| 2018/0373478 A1* | 12/2018 | Miyaji | .................. | G06F 3/1222 |
| 2019/0057240 A1* | 2/2019 | Li | ....................... | G06K 9/00006 |
| 2019/0236259 A1* | 8/2019 | Remillet | ................. | G06F 21/32 |
| 2020/0301150 A1* | 9/2020 | Breed | ................ | G02B 27/0172 |

OTHER PUBLICATIONS

Luo, Guangsheng, Wenwei Li, and Yuzhong Peng. "Overview of Intelligent Online Banking System Based on HERCULES Architecture." IEEE Access 8 (2020): 107685-107699. (Year: 2020).*

Katsini, Christina, Christos Fidas, Marios Belk, Nikolaos Avouris, and George Samaras. "Influences of users' cognitive strategies on graphical password composition." In Proceedings of the 2017 CHI Conference Extended Abstracts on Human Factors in Computing Systems, pp. 2698-2705. 2017. (Year: 2017).*

Vorster, Johannes S., Renier P. Van Heerden, and Barry Irwin. "The pattern-richness of graphical passwords." In 2016 Information Security for South Africa (ISSA), pp. 69-76. IEEE, 2016. (Year: 2016).*

National Institute of Industrial Property, Preliminary Search Report issued in French Patent Application No. 1859828 dated Aug. 13, 2019, and English translation thereof.

* cited by examiner

| Session | Object | Display position |
|---|---|---|
| Session 1 | Obj1.1 | Coordinate $(x_1, y_1)$ |
| Session 1 | Obj1.2 | Coordinate $(x_2, y_2)$ |
| Session 1 | Obj1.3 | Coordinate $(x_3, y_3)$ |
| ... | ... | ... |

| Session | Object | Display position |
|---|---|---|
| Session 2 | Obj1.1 | Coordinate $(x_3, y_2)$ |
| Session 2 | Obj1.2 | Coordinate $(x_4, y_7)$ |
| Session 2 | Obj1.3 | Coordinate $(x_1, y_1)$ |
| ... | ... | ... |

POINT AND CLICK AUTHENTICATION

TECHNICAL FIELD

The present invention relates generally to multi-factor authentication, although not limited thereto. More specifically, the present invention relates to techniques for multi-factor authentication using graphical passwords.

BACKGROUND

Existing authentication techniques may use passwords either alone or in combination with an identifier such as a user name to verify identities and/or limit access to protected resources. In some instances, multi-factor authentication may be used in which two or more factors from distinct categories of credentials are evaluated during authentication such that each additional factor adds an additional layer of security to the authentication process.

Examples of such additional factors that are evaluated during authentication include: hardware-based tokens (e.g., RSA SecurID provided by RSA Security LLC. of Bedford, Mass.) for challenge/response authentication; biometric scanners (e.g., finger print scanners); one time passwords sent by text/voice messaging or e-mail, and the like. The additional layers of security provided by these additional factors are effective for the most part; however, these existing techniques also represent increased implementation and maintenance costs.

Other existing techniques of multi-factor authentication utilize in which graphical content define passwords (e.g., graphical passwords). As an example, cued click points represent an existing graphic-based technique in which a password is based on several images that are presented in sequence to a user. In particular, a position of where the user clicks within each position determines what subsequent image is presented to the user and the path taken by the user through the sequence of images represents the password. While effective in most instances, such graphic-based techniques may be vulnerable to record/replay and phishing attacks. Cued click points, for example, often presents users with the same images from the same bank of images for authentication. As such, observation of a user entering a password could compromise the password.

SUMMARY

Embodiments of the present invention provide systems, methods, and computer-readable storage media for multi-factor authentication using graphical passwords. In an embodiment, a method includes receiving a first access request from a client device. The first access request identifies a protected resource and includes an identifier. A first interface is generated that includes a plurality of graphical objects for presentation at random locations on a display of the client device as defined by a first object map. The plurality of graphical objects include a null object and a set of user-defined objects associated with the identifier that define a graphical password. Input data including an input event for each interaction with the first interface that the client device detects is received. The input event for each interaction identifies a position on the display at which a corresponding interaction was detected. Using the first object map, it is determined that the input data satisfies the graphical password. Access to the protected resource is granted in response to determining that the input data satisfies the graphical password.

In another embodiment, a system includes an electronic device with a display, a processor, and a computer-readable storage medium that includes instructions. Upon execution by the processor, the instructions cause the system to perform operations. The operations include sending an access request to an access service of a host server. The access request identifies a protected resource and includes an identifier. In response, an interface is received from the access service that includes a plurality of graphical objects for presentation on the display. An input event is recorded for each detected interaction with the interface while presenting the interface on the display. Each input event identifies a position on the display at which a corresponding interaction was detected. Input data is sent to the access service that includes each recorded input event. Access to the protected resource is received when the access service determines that the input data satisfies a graphical password using an object map. The graphical password is defined by a set of user-defined objects included among the plurality of graphical objects. The object map defines randomly assigned positions for presenting the plurality of graphical objects on the display.

In another embodiment, a non-transitory computer-readable storage medium including program instructions is provided. Upon execution by a processor of a computing device, the program instructions cause the computing device to receive, at an access service associated with a host server, an access request from a client device. The access request identifies a protected resource and includes an identifier. An interface is generated that includes a plurality of graphical objects for presentation at random positions on a display of the client device as defined by an object map. The plurality of graphical objects include a null object and a set of user-defined objects associated with the identifier that define a graphical password. Input data is received that includes an input event for each interaction with the interface that the client device detects. Each input event identifying a position on the display at which a corresponding interaction was detected. Using the object map, it is determined whether the input data satisfies the graphical password. Access is granted to the protected resource in accordance with a determination that the input data satisfies the graphical password.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The accompanying drawings, which are incorporated in and constitute a part of this specification, illustrate various embodiments of the present invention and, together with the general description of the invention given above, and the detailed description of the embodiments given below, serve to explain the embodiments of the invention. In the drawings, like reference numerals are used to indicate like parts in the various views.

FIGS. 5A and 5B depict examples of object maps that each define randomly (or pseudo-randomly) assigned positions for presenting a plurality of graphical objects on a display of a client device.

DETAILED DESCRIPTION

Figure 1:
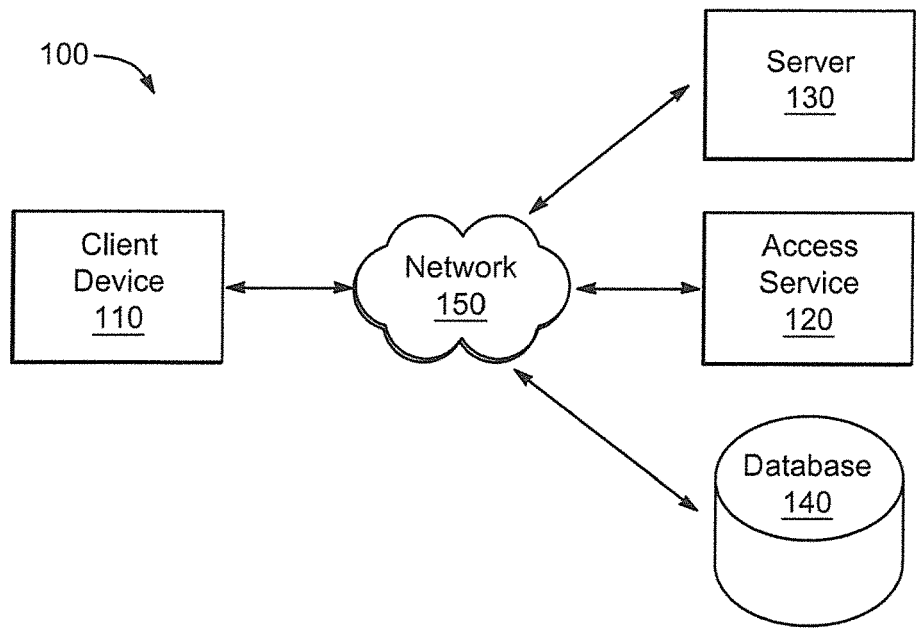
FIG. 1 is a block diagram of an example operating environment that is suitable for implementing aspects of the present invention.

Techniques described herein relate to multi-factor authentication using graphical passwords. Referring to FIG. 1, an example operating environment for implementing aspects of the present invention is illustrated and designated generally 100. In general, operating environment 100 represents the various components involved in providing multi-factor authentication. Operating environment 100 includes client device 110, access service 120, server 130, and database 140. By way of example and not limitation, client device 110 may be embodied as a desktop computer, a laptop computer, a mobile computing device, a smartphone, a tablet computer, a smart watch, a consumer electronic device, a workstation, and the like.

A user, in operating environment 100, interacts with client device 110 to access protected resources within a host domain via network 150. In the example depicted in FIG. 1, the host domain is composed of a plurality of components including access service 120, server 130, and database 140. As used herein, a "protected resource" generally refers to any computing resource residing within a host domain to which access is limited, controlled, or restricted. Examples of protected resources include: services, applications, documents, files, account information, objects, application programming interfaces, webpages, executable code, and the like.

In operating environment 100, the user of client device 110 accesses a protected resource within the host domain by sending an access request identifying the protected resource. For example, the access request may identify an application executing within a runtime environment of server 130 or data residing in database 140. In an embodiment, a protected resource is identified by a Uniform Resource Identifier ("URI"), such as a Uniform Resource Locator ("URL"). Access service 120 implements an authentication process upon receiving the access request, as described in greater detail below. Access to the protected resource is either granted or denied by access service 120 dependent upon an outcome of the authentication process.

FIG. 1 depicts the various components as communicating with each other via network 150, which may include one or more public and/or private networks. Examples of networks that are suitable for implementing network 150 include: local area networks (LANs), wide area networks (WANs), cellular network, the Internet, virtual private networks (VPNs), and the like. Client device 110 and components of the host domain (e.g., access service 120, server 130, and database 140) exchange data in accordance with a communication protocol governing the connection, such as hypertext transfer protocol ("HTTP"), file transfer protocol ("FTP"), Websocket protocol, user datagram protocol ("UDP"), and the like.

Figure 10:
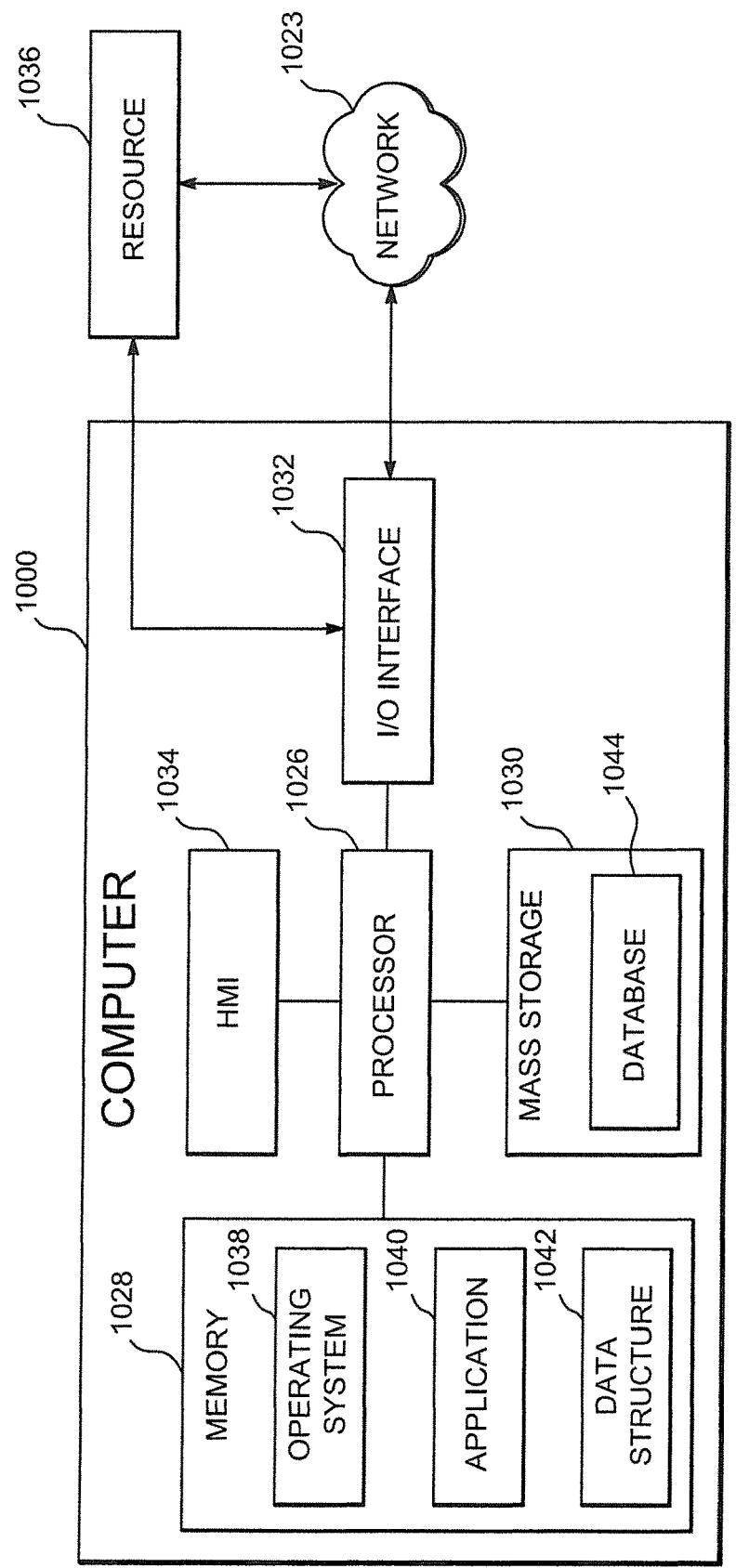
FIG. 10 is a block diagram of an example computing environment suitable for use in implementing embodiments of the invention.

Each of the systems shown in FIG. 1 may be implemented via any type of computing system, such as computing system 1000 described in greater detail below with respect to FIG. 10, for example. Each system shown in FIG. 1 may comprise a single device or multiple devices cooperating in a distributed environment. For instance, access service 120, server 130, and/or database 140 may be provided via multiple devices arranged in a distributed environment that collectively provides the functionality described herein. Additionally, other components not shown may also be included within the distributed environment.

In accordance with aspects of the present invention, authenticating users submitting access requests identifying protected resources of a host domain involves an access service of the host domain generating an interface including a plurality of graphical objects for presentation on a display of a client device to a user. As used herein, a "graphical object" generally refers to a user-selectable element of a graphical user interface for presentation on a display of a computing device. For example, a graphical object may be implemented as an icon, a pictogram, an ideogram, an emoji, a logo, an image, a photo, and the like. The plurality of graphical objects include at least one null object and a set of user-defined objects. The set of user-defined objects define a graphical password while null objects represent decoys.

Creation of a graphical password generally involves a user selecting a number of graphical objects that collectively form the set of user-defined objects. A computing device associated with a host domain (e.g., access service 120 of FIG. 1 and access service 250) receives that selection and updates a corresponding user profile of the user accordingly. The set of user-defined objects are used by an access service of the host domain to authenticate any subsequently access requests that include an identifier associated with that user profile, as described in greater detail below.

In an embodiment, at least one user-defined object among the set of user-defined objects is a custom object submitted by the user. For example, the user may upload an icon created by the user with graphics editing software or an image downloaded from the Internet for use as a user-defined object. In an embodiment, at least one user-defined object among the set of user-defined objects includes image data obtained using an image sensor of a client device. For example, the user may upload a photo of themselves or a family member for use as a user-defined object. In an embodiment, at least one user-defined object among the set of user-defined objects is a template object selected from among a plurality of template objects stored on a host server (e.g., server 130 and database 140 of FIG. 1) of the host domain. For example, a host server may store a plurality of template objects in a library of graphical objects from which the user may select for use as a user-defined object. In an embodiment, each user-defined object among the set of user-defined objects share a common visual attribute. For example, in creating a graphical password, a user may specify that each user-defined object must be displayed in a common color (e.g., red).

Figure 2:
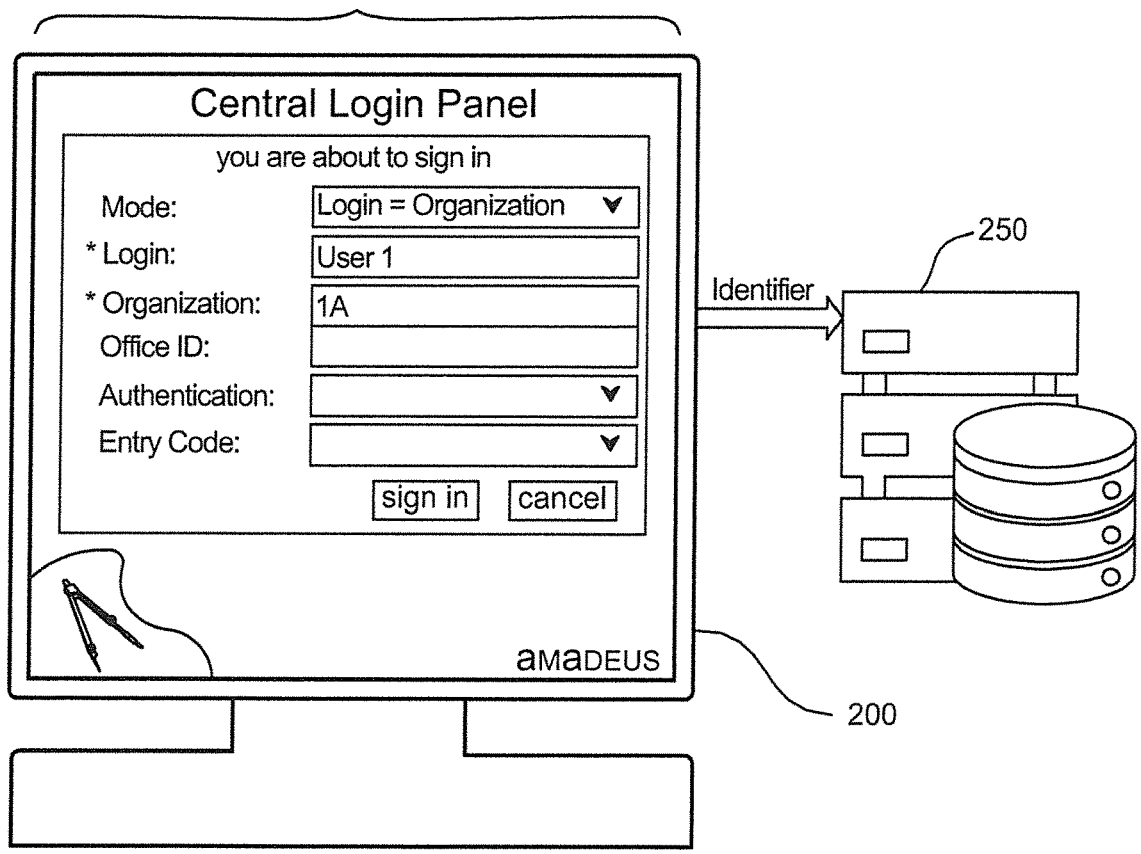
FIG. 2 depicts an example of a client device sending an access request to an access service.
Figure 3:
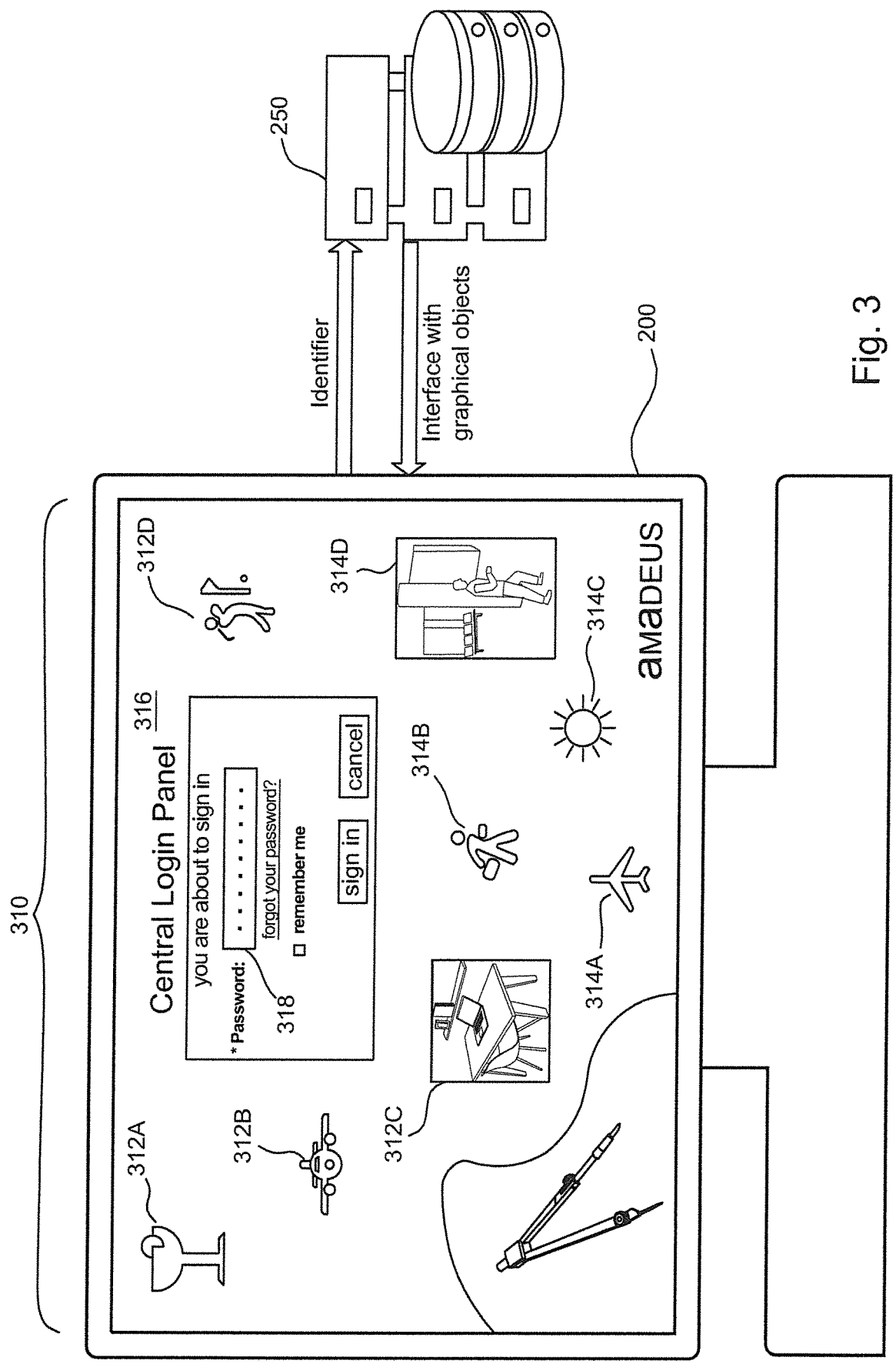
FIG. 3 depicts the access service of FIG. 2 sending an interface with a plurality of graphical objects to the client device in response to the access request.
Figure 4:
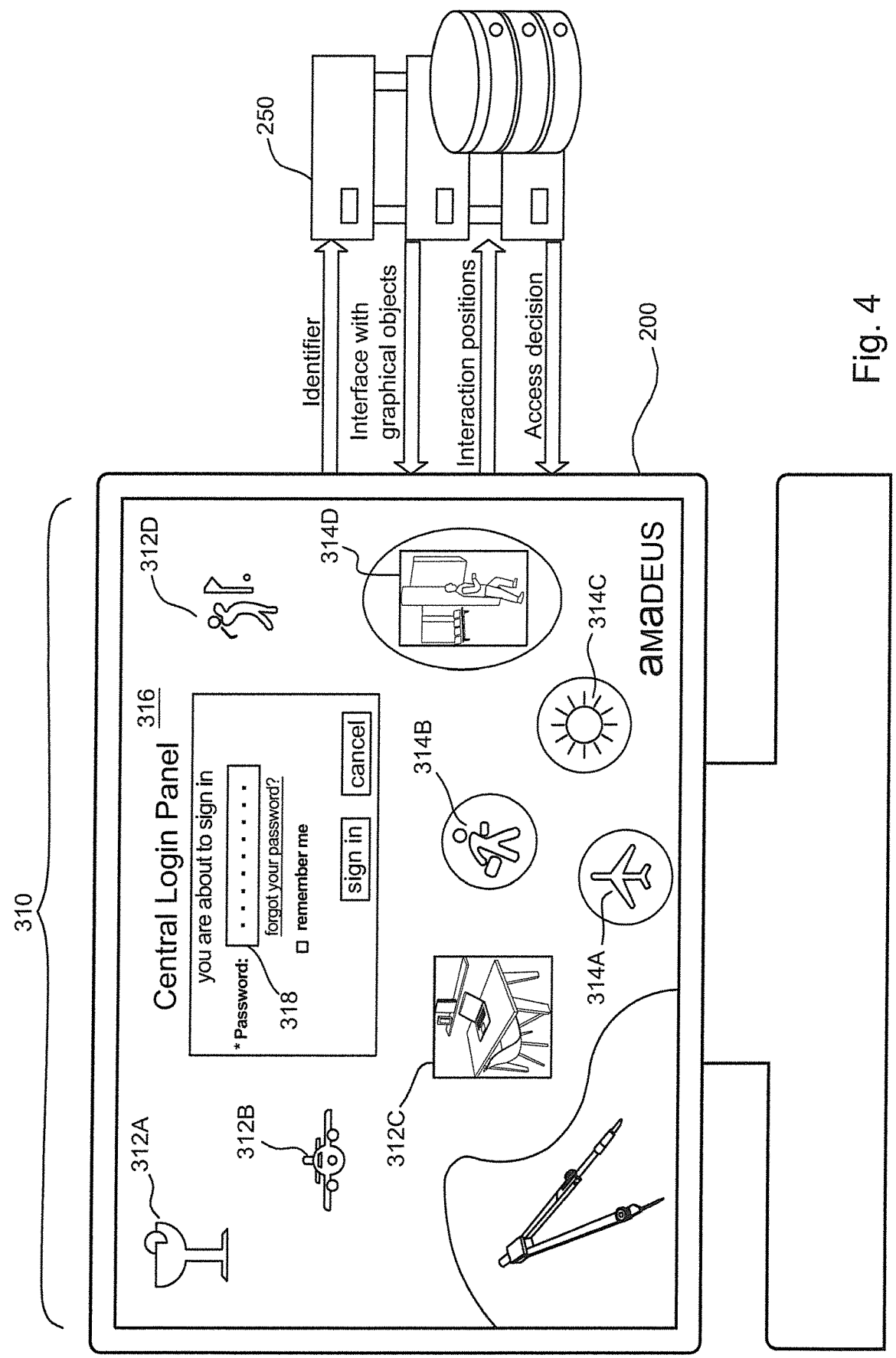
FIG. 4 depicts the client device of FIG. 2 sending input data including an input event identifying positions on a display of the client device for each interaction with the interface of FIG. 3 to the access service and receiving an access decision from the access service based on a comparison of the input data and an object map.

FIGS. 2-4 depict an example of a client device 200 interacting with an access service 250 of a host domain to access protected resources within the host domain, in accordance with aspects of the present invention. In an embodiment, client device 200 and access service 250 may be implemented by client device 110 and access service 120 of FIG. 1, respectively. To access a protected resource within the host domain, client device 200 sends an access request identifying the protected resource to access service 250. As seen in FIG. 2, the access request includes an identifier that client device 200 receives from a user via interface 210. In an embodiment, the identifier corresponds to a user profile (or account) created with the host domain.

Access service 250 is configured to generate an interface that includes a plurality of graphical objects, such as interface 310 of FIG. 3, in response to receiving the access request from client device 200. In an embodiment, interface 310 is associated with an application executing on a host server (e.g., server 130 of FIG. 1) of the host domain. The plurality of graphical objects of interface 310 includes both null objects (i.e., graphical objects 312A-312D) and a set of user-defined objects (i.e., graphical objects 314A-314D). Graphical objects 314A-314D are selected for inclusion in interface 310 as the set of user-defined objects using data that access service 250 obtains from a user profile associated with the identifier included in the access request. Graphical objects 312A-312D are selected for inclusion in interface 310 as the null objects using data that access service 250 obtains from a library of graphical objects. In an embodiment, access service 250 is configured to verify that a null object is distinct from any graphical object included in a set of user-defined objects prior to selecting the null object for inclusion in an interface.

Upon selecting graphical objects 312A-312D as the null objects and graphical objects 314A-314D as the set of user-defined objects, access service 250 randomly (or pseudo-randomly) positions each graphical object to a different position on background image content 316 to generate interface 310. In an embodiment, access service 250 utilizes an output of a randomization function to define a position of each graphical object within interface 310. In an embodiment, the randomization function resides in eXecute-Only-Memory ("XOM") of a computing device effectuating access service 250. Prior to sending interface 310 to client device 200, access service 250 stores configuration information for interface 310 in an object map (e.g., object maps 500 and 550 of FIGS. 5A and 5B, respectively). The configuration information for interface 310 stored in the object map represents the only location in which a display position of a particular graphical object within interface 310 is mapped (or linked) to that graphical object.

While presenting interface 310 on a display of client device 200, a user of client device 200 interacted (or selected) graphical objects 314A-314D, which is represented in FIG. 4 by encircling those graphical objects. One skilled in the art will recognize that selection of graphical objects 314A-314D does not necessitate updating interface 310 to provide the user with visual feedback information identifying the selected graphical objects (e.g., by encircling those graphical objects). In an embodiment, client device 200 is configured to update interface 310 in response to detecting an interaction with a particular graphical object. For example, client device 200 may modify one or more visual aspects of the particular graphical object (e.g., color, opacity, and the like), overlay the particular graphical object with visual content (e.g., a check mark), or modify one or more visual aspects of background image content 316 proximate to the particular graphical object.

Client device 200 is configured to record an input event for each detected interaction with interface. Each input event that client device 200 records identifies a position on the display at which a corresponding interaction was detected. Input data including each recorded input event is sent to access service 250 for authentication purposes. The input data sent by client device 200 to access service 250 lacks any information identifying particular graphical objects of interface 310. Instead, that input data only includes information corresponding to the detected interactions, such as display positions, interaction characteristics, and the like.

Figure 7:
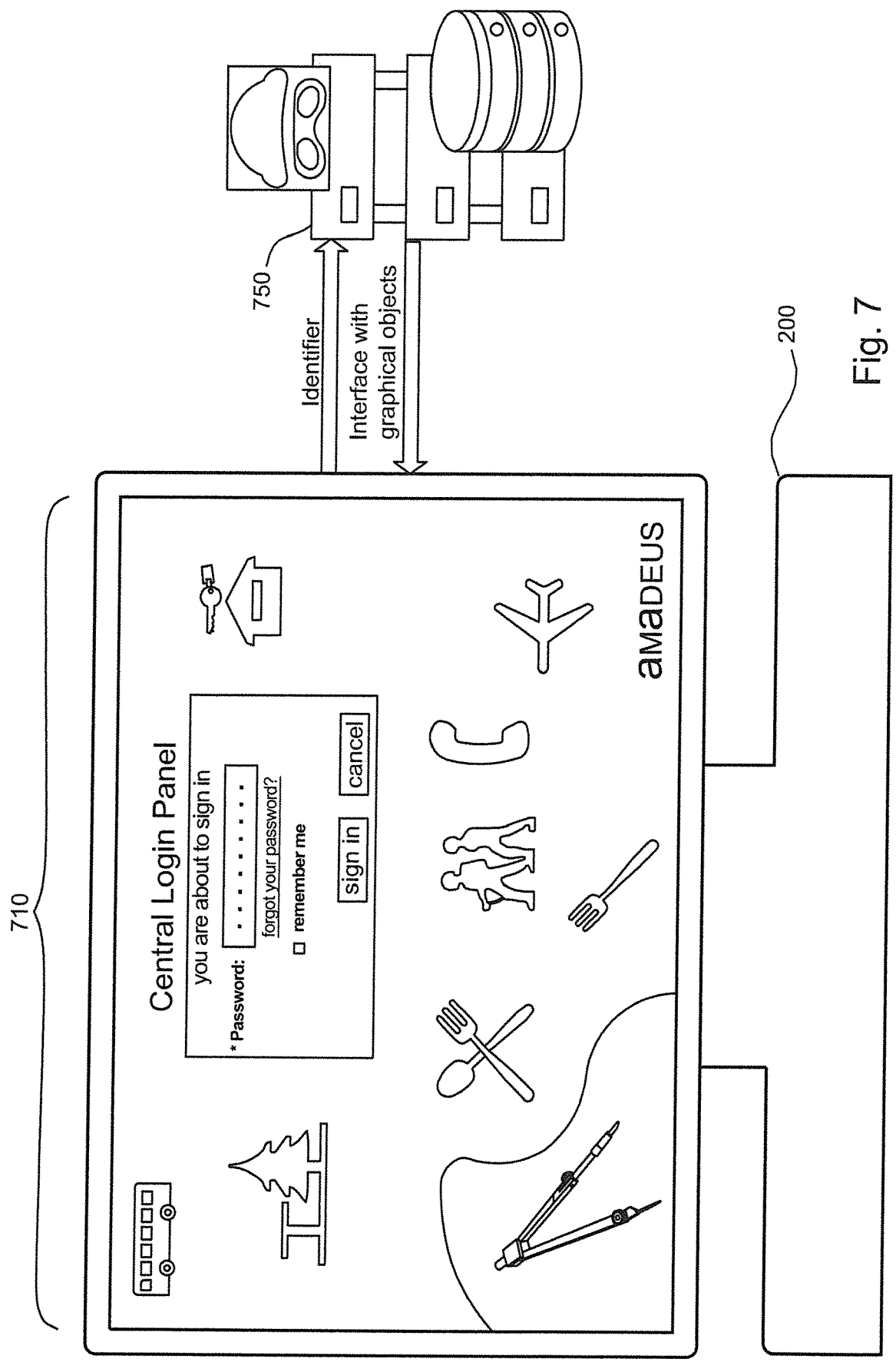
FIG. 7 depicts an example of a phishing attack on the client device of FIG. 2. by a malicious entity posing as the access service of FIG. 2.

Since the object map for interface 310 stored on access service 250 is the only location in which a graphical object-display position mapping resides and the input data sent by client device 200 only includes interaction-related information, no information distinguishing between null objects and user-selected objects is exchanged between access service 250 and client device 200 during authentication. One benefit realized by this arrangement is that no information explicitly identifying the set of user-defined objects that define the graphical password is available for interception by a malicious entity. As such, the likelihood that the malicious entity can successfully effectuate a phishing attack (e.g., the phishing attack described below with respect to FIG. 7 is reduced).

In an embodiment, the position on the display ("display position") is defined by a pair of display position coordinate values (e.g., "x" and "y" values). In an embodiment, the display position is defined by pixel coordinate values. In an embodiment, each recorded input event may include information characterizing the corresponding interaction. For example, if the display is a touch screen, the information characterizing the corresponding interaction may include a duration of time in which an object remained in contact with the touch screen, an orientation of the object as it contacted the touch screen, an area of the touch screen in which contact between the object and the touch screen occurred, any movement or acceleration information associated with the object as it remained in contact with the touchscreen, and the like.

In response to receiving the input data from client device 200, access service 250 determines whether the input data satisfies the graphical password using the object map storing the configuration information for interface 310. That determination generally involves access service 250 evaluating the display position associated with each input event with the object map to identify a particular graphical object that was selected in a given interaction. In the example of FIG. 4, access service 250 would identify graphical objects 314A-314D as being selected based on the display position information included in the input data. Since the set of user-defined objects that define the graphical password of this example consist of graphical objects 314A-314D, access service 250 would determine that the input data satisfies the graphical password.

In some embodiments, an order in which graphical objects of the set of user-defined objects are selected is relevant to determining whether the input data satisfies the graphical password. For example, access service 250 may evaluate time stamps associated with each recorded input event and determine that the order in which the set of user-defined objects were selected was: graphical object 314C, graphical object 314A, graphical object 314B, and graphical object 314D. Yet, data from the user profile may indicate that a prescribed order for the graphical password is: graphical object 314B, graphical object 314D, graphical object 314C, and graphical object 314A. As such, the graphical password is further defined by a sequence-based criterion. In this example, access service 250 would determine that while each graphical objects included in the set of user-defined objects were selected, the input data does not satisfy the graphical password because the set of user-defined objects were not selected in the prescribed order.

In some embodiments, data from the user profile may specify other criterion to further define the graphical password. In an embodiment, the data from the user profile may specify that each user-defined object defining the graphical password must be selected without selecting a null object. In an embodiment, the data from the user profile may include multiple criterion. For example, the data from the user profile may specify that each user-defined object defining the graphical password must be selected in a specified order without selecting a null object. In an embodiment, the data from the user profile may specify a characteristic of an interaction for selecting at least one user-defined object among the set of user-defined objects. In this embodiment, the graphical password is further defined by a behavior-based criterion. A behavior-based criterion may specify that a particular user-defined object must be selected by double-clicking it. Another behavior-based criterion may specify that when the display is a touch screen each user-defined object must be selected without breaking contact with the touch screen.

As another example of a behavior-based criterion, the data from the user profile may indicate that an interaction with graphical object 314C must last at least 2 seconds. If the display is a touch screen, access service 250 may identify an interaction event in the input data that corresponds to graphical object 314C. Access service 250 may then extract information characterizing a corresponding interaction from that interaction. If an evaluation of the information indicates that an object remained in contact with the touch screen at the display position associated with graphical object 314C for at least two seconds, access service 250 may determine that the input data satisfies the graphical password. Otherwise, if an evaluation of the information indicates that an object remained in contact with the touch screen at the display position associated with graphical object 314C for only one second, access service 250 may determine that the input data does not satisfy the graphical password.

Upon determining whether the input data satisfies the graphical password, access service 250 provides client device 200 with an access decision based on that determination. If access service 250 determines that the input data satisfies the graphical password using the object map, access service 250 grants client device 200 with access to the protected resource. Alternatively, if access service 250 determines that the input data does not satisfy the graphical password using the object map, access service 250 denies client device 200 access to the protected resource. In an embodiment in which access service 250 denies access to the protected resource, access service 250 provides client device 200 with an indication that access is denied. In an embodiment in which access service 250 denies access to the protected resource, access service 250 logs information concerning client device 200 and the access request. In an embodiment in which access service 250 denies access to the protected resource, access service 250 terminates a connection between access service 250 and client device 200.

In an embodiment, in which access service 250 provides token-based authentication, granting access to the protected resource includes sending an access token to client device 200. In this embodiment, client device 200 stores the access token (e.g., a JavaScript Object Notation Web Token) in local memory for inclusion in subsequent access requests. Client device 200 would include the access token in subsequent access requests identifying protected resources in the host domain. In an embodiment, in which access service 250 provides session-based authentication, granting access to the protected resource includes generating a session in a memory space of a host server that enables client device 200 to access the protected resource. For example, access service 250 may instruct the host server (e.g., server 130 of FIG. 1) to initiate a remote desktop or application session (remote session) effectuated in a memory space of the host server. In this example, access service 250 may provide client device 200 with a session identifier corresponding to the remote session initiated by the host server.

In an embodiment, interface 310 optionally includes password input field 318. In an embodiment, password input field 318 is in an inactive state prior to access service determining whether input data satisfies a graphical password. In an embodiment, in response to determining that the input data satisfies the graphical password, access service 250 is configured to activate password input field 318 prior to granting client device 200 with access to the protected resource. In an embodiment, access service 250 activates password input field 318 by communicating data to client device 200 that causes password input field 318 to transition from the inactive state to an active state.

In an embodiment, interface 210 of FIG. 2 includes a password input field that is similar to password input field 318 with the exception that the password input field is in an active state prior to sending an access request. In an embodiment, client device 200 sends access service 250 an access request that includes a password associated with an identifier. In an embodiment, access service 250 validates the password prior to sending interface 310.

FIGS. 5A-5B depict examples of object maps that each define randomly (or pseudo-randomly) assigned positions for presenting a plurality of graphical objects on a display of a client device. In particular, FIG. 5A depicts an object map 500 corresponding to a first access request including an identifier and FIG. 5B depicts an object map 550 corresponding to a second access request that includes the same identifier from the first access request. By way of example, the first access request may be received by an access service (e.g., access service 120 of FIG. 1 and access service 250 of FIG. 2) during a first session whereas the second access request may be received by the access service during a second session subsequent to the first session.

A comparison between FIGS. 5A and 5B is intended to illustrate that an access service implemented in accordance with the present invention will send different interfaces across authentication sessions even when multiple access requests include the same identifier. In the examples illustrated by FIGS. 5A and 5B, object maps 500 and 550 each generally include information pertaining to: (i) a session associated with a corresponding interface; (ii) graphical objects included in the corresponding interface; and (iii) display positions of each graphical object within the corresponding interface.

In the examples of FIGS. 5A and 5B, object maps 500 and 550 are depicted and described as only including graphical object-related information pertaining to user-defined objects. However, one skilled in the art will appreciated that other variations are possible. For example, in some embodiments, an object map will also include graphical object-related information pertaining to null objects.

As noted above, object maps 500 and 550 correspond to first and second access requests, respectively, that each include the same identifier. In this example, a set of user-defined objects will consist of graphical objects 1.1, 1.2, and 1.3. Accordingly, the interface defined by object map 500 (the "first interface") and the interface defined by object map 550 (the "second interface") both include the same set of user-defined objects. Yet, through random or pseudo-random) placement, individual graphical objects comprising that same set of user-defined objects are located at different display positions within the first and second interfaces.

For example, a display position of graphical object 1.2 in the first interface is proximate to coordinate pair $(x_2, y_2)$ whereas that display position is proximate to coordinate pair $(x_4, y_7)$ in the second interface. As another example, coordinate pair $(x_1, y_1)$ is proximate to a display position of graphical object 1.1 in the first interface, whereas that coordinate pair is proximate to graphical object 1.3 in the second interface. One benefit realized by this session-to-session variation of graphical object display positions within interfaces is that the utility of information obtained by a malicious entity from recording (or observing) an interface presented in one authentication session is reduced with respect to subsequent authentication sessions. As such, the likelihood that the malicious entity can successfully effectuate a replay attack (e.g., the replay attack described below with respect to FIG. 6) is reduced.

Figure 6:
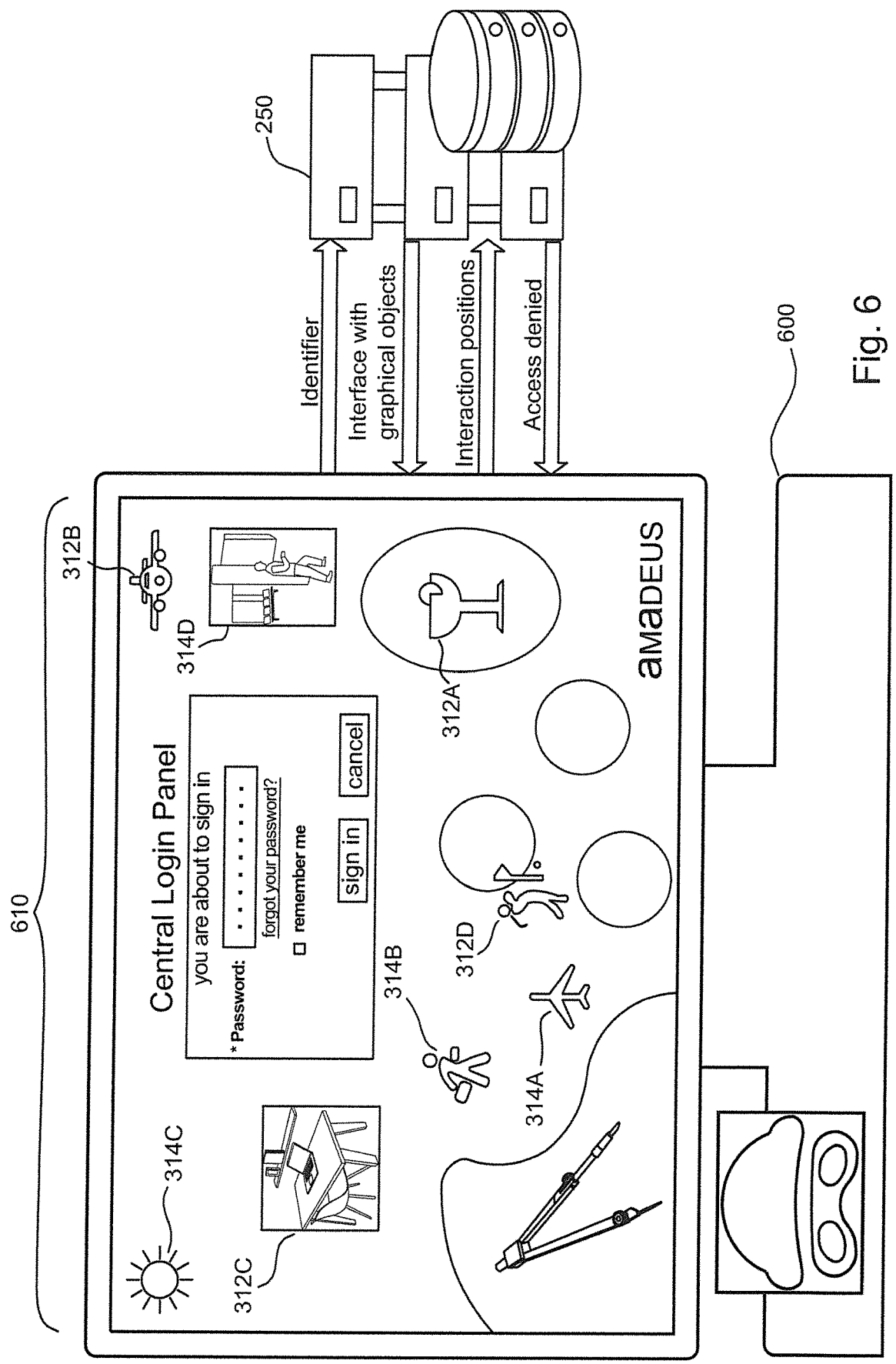
FIG. 6 depicts an example of a replay attack on the access service of FIG. 2. by a malicious entity posing as the client device of FIG. 2.

FIG. 6 depicts an example of a replay attack on the access service of FIG. 2. by a malicious entity 600 posing as the client device of FIG. 2. In this example, malicious entity 600 is attempting to gain access to protected resources of the host domain by submitting an access request to access service 250 that includes the identifier of the user of client device 200. Similar to the examples depicted by FIGS. 2-4, access service 250 uses data obtained from the user profile associated with the identifier included in the access request to select the appropriate graphical objects that define the graphical password established for the user profile. Since malicious entity 600 submits an access request with the same identifier that was included in the access request sent by client device 200 in FIG. 2, graphical objects 314A-314D are again selected for inclusion in interface 610 as the set of user-defined objects.

However, because of the session-to-session variation of graphical object display positions within interfaces discussed above, a comparison between FIGS. 3 and 6 show that the display positions of graphical objects 314A-314D within interface 610 is distinct from their corresponding display positions within interface 310. As a result, an object map defining display positions of graphical objects within interface 610 will be distinct from an object map defining display positions of graphical objects within interface 310. Thus, when malicious entity 600 sends the same input data to access service 250 as was sent by client device 200 in FIG. 4 for authentication purposes, access service 250 will determine in this instance that the same input data does not satisfy the graphical password using the object map corresponding to interface 610. Consequently, access service 250 will deny malicious entity 600 with access to the protected resource.

FIG. 7 depicts an example of a phishing attack on the client device by a malicious entity 750 posing as the access service of FIG. 2. In this example, malicious entity 750 is attempting to trick a user of client device 200 into entering information indicative of the graphical password established for their user profile into malicious interface 710. By way of example, malicious entity 750 may represent malicious entity 600 after their unsuccessful replay attack depicted in FIG. 6.

As discussed above with respect to FIG. 4, the object map for interface 310 stored on access service 250 is the only location in which a graphical object-display position mapping resides. Moreover, the input data sent by client device 200 when interface 310 is presented on a display of client device 200 only includes interaction-related information. Therefore, no information distinguishing between null objects and user-selected objects was exchanged between access service 250 and client device 200 during the example authentication process illustrated by FIGS. 2-4. Thus, no information explicitly identifying the set of user-defined objects that define the graphical password established for the user profile associated client device 200 was available for interception by a malicious entity, such as malicious entity 750.

FIG. 7 illustrates an example of how implementing the present invention reduces the likelihood that a malicious entity can successfully effectuate a phishing attack. A comparison between FIG. 7 and FIG. 3 or FIG. 6 illustrates that interface 710 in many ways appears similar to interfaces 310 and 610 that were each generated by access service 250. One notable difference between interface 710 and either interface 310 or interface 610 is that none of the graphical objects included in interface 310 or interface 610 is included in interface 710. In particular, none of the graphical objects in the set of user-defined objects that define the graphical password established for the user profile associated client device 200 are present in interface 710. The user of client device 200 observed the absence of the user-defined object in interface 710, and so client device 200 did not record any interaction events. Without any recorded interaction events, client device 200 has no input data to send to malicious entity 750. Consequently, the phishing attack of malicious entity 750 is thwarted.

Figure 8:
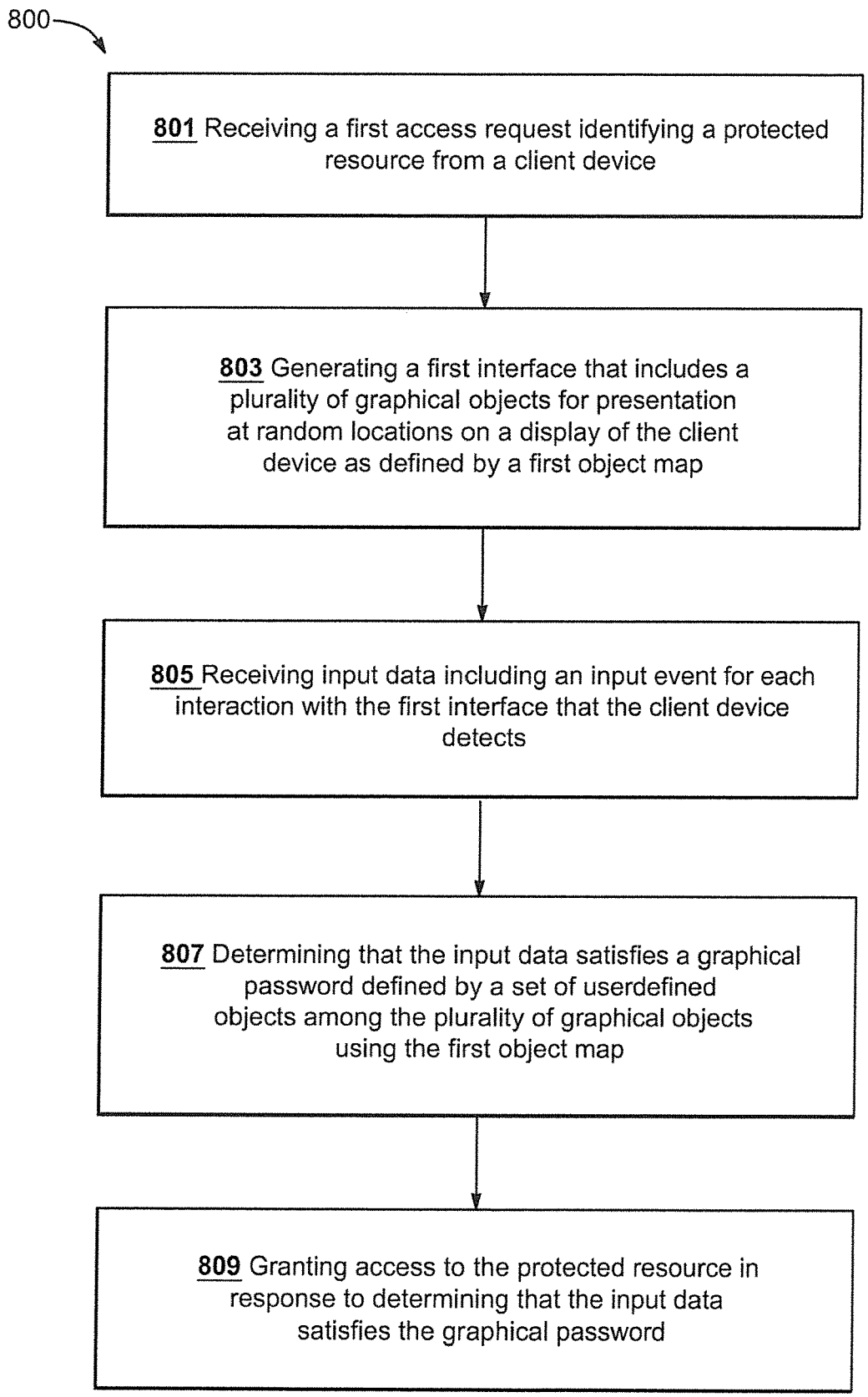
FIG. 8 is a flow-chart illustrating an example process for multi-factor authentication using graphical passwords.

Referring to FIG. 8, an example process 800 of multi-factor authentication using graphical passwords is illustrated. In an embodiment, process 800 is effectuated by authentication service 122 of FIG. 1. At block 801, an access request identifying a protected resource is received from a client device. The access request that is sent at block 801 includes an identifier. At block 803, an interface is generated that includes a plurality of graphical objects for presentation at random (or pseudo-random) locations on a display of the client device as defined by a first object map. The plurality of graphical objects of the interface generated at block 803 include a null object and a set of user-defined objects associated with the identifier that define a graphical password. In an embodiment, the interface is associated with an application executing on a host server (e.g., server 130 of FIG. 1) of a host domain.

At block 805, input data is received from the client device. The input data that is received from the client device at block 805 includes an input event for each interaction with the interface that the client device detects. The input event for each interaction identifies a position on the display at which a corresponding interaction was detected. At block 807, it is determined that the input data satisfies the graphical password using the object map. At block 809, access is granted to the protected resource in response to determining that the input data satisfies the graphical password.

Figure 9:
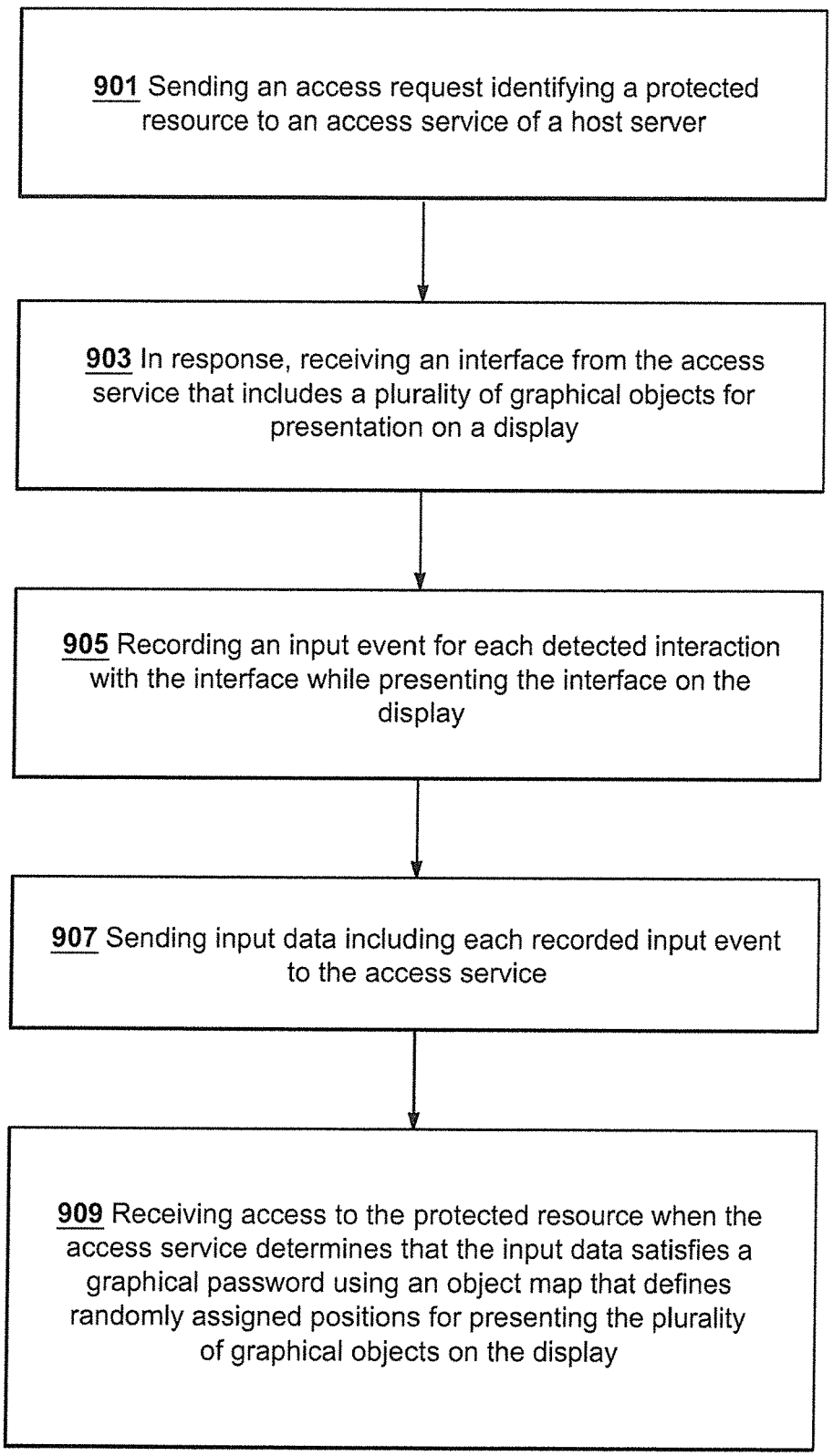
FIG. 9 is a flow-chart illustrating another example process for multi-factor authentication using graphical passwords.

Referring to FIG. 9, another example process 900 of multi-factor authentication using graphical passwords is illustrated. In an embodiment, process 900 is effectuated by client device 110 of FIG. 1 and/or client device 200 of FIGS. 2-4. At block 901, an access request identifying a protected resource is sent to an access service of a host server. The access request that is sent at block 901 includes an identifier. In an embodiment, the access request further includes a password associated with the identifier. In response, an interface is received from the access service that includes a plurality of graphical objects for presentation on the display, at block 903. In an embodiment in which the access request further includes a password associated with the identifier, the access service validates the password prior to sending the interface. In an embodiment, the interface is associated with an application executing on the host server.

At block 905, an input event is recorded for each detected interaction with the interface while presenting the interface on the display. Each input event recorded at block 905 identifies a position on the display at which a corresponding interaction was detected. At block 907, input data is sent to the access service that includes each recorded input. At block 909, access to the protected resource is received when the access service determines that the input data satisfies a graphical password using an object map. The object map defines randomly (or pseudo-randomly) assigned positions for presenting each of the plurality of graphical objects on the display. The graphical password is defined by a set of user-defined objects that are included among the plurality of graphical objects in the interface received at block 903.

In an embodiment, each user-defined object among a set of user-defined objects defining a graphical password share a common visual attribute. In an embodiment, at least one user-defined object among a set of user-defined objects is a custom object submitted by a user of a client device. In an embodiment, at least one user-defined object among a set of user-defined objects is a template object selected from among a plurality of template objects stored on a host server.

In an embodiment, the graphical password is further defined by a sequence-based criterion that specifies an order for selecting each user-defined object among the set of user-defined objects. In an embodiment, the graphical password is further defined by a behavior-based criterion that specifies a characteristic of an interaction for selecting at least one user-defined object among the set of user-defined objects.

In an embodiment, receiving access to the protected resource includes receiving an access token form the access service for inclusion in subsequent requests sent to the host server. In an embodiment, receiving access to the protected resource includes receiving a session identifier from the access service corresponding to a session in a memory space of the host server that enables access to the protected resource.

In an embodiment, process 800 and/or process 900 is performed by processing logic, including hardware, firmware, software, or a combination thereof. In an embodiment, process 800 and/or process 900 is performed by a processor executing code stored in a non-transitory computer-readable medium (e.g., a memory).

Having described various embodiments of the invention, an exemplary computing environment suitable for implementing embodiments of the invention is now described. With reference to FIG. 10, client device 110, access service 120, server 130, database 140, client device 200, access service 250, malicious entity 600, and malicious entity 750 may be implemented on one or more computer devices or systems, such as exemplary computer system 1000. The computer system 1000 may include a processor 1026, a memory 1028, a mass storage memory device 1030, an input/output (I/O) interface 1032, and a Human Machine Interface (HMI) 1034. The computer system 1000 may also be operatively coupled to one or more external resources 1036 via the network 1023 or I/O interface 1032. External resources may include, but are not limited to, servers, databases, mass storage devices, peripheral devices, cloud-based network services, or any other suitable computer resource that may be used by the computer system 1000.

The processor 1026 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1028. The memory 1028 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 1030 may include data storage devices such as a hard drive, optical drive, tape drive, non-volatile solid state device, or any other device capable of storing information.

The processor 1026 may operate under the control of an operating system 1038 that resides in the memory 1028. The operating system 1038 may manage computer resources so that computer program code embodied as one or more computer software applications, such as an application 1040 residing in memory 1028, may have instructions executed by the processor 1026. In an alternative embodiment, the processor 1026 may execute the application 1040 directly, in which case the operating system 1038 may be omitted. One or more data structures 1042 may also reside in memory 1028, and may be used by the processor 1026, operating system 1038, or application 1040 to store or manipulate data.

The I/O interface 1032 may provide a machine interface that operatively couples the processor 1026 to other devices and systems, such as the network 1023 or the one or more external resources 1036. The application 1040 may thereby work cooperatively with the network 1023 or the external resources 1036 by communicating via the I/O interface 1032 to provide the various features, functions, applications, processes, or modules comprising embodiments of the invention. The application 1040 may also have program code that is executed by the one or more external resources 1036, or otherwise rely on functions or signals provided by other system or network components external to the computer system 1000. Indeed, given the nearly endless hardware and software configurations possible, persons having ordinary skill in the art will understand that embodiments of the invention may include applications that are located externally to the computer system 1000, distributed among multiple computers or other external resources 1036, or provided by computing resources (hardware and software) that are provided as a service over the network 1023, such as a cloud computing service.

The HMI 1034 may be operatively coupled to the processor 1026 of computer system 1000 in a known manner to allow a user to interact directly with the computer system 1000. The HMI 1034 may include video or alphanumeric displays, a touch screen, a speaker, and any other suitable audio and visual indicators capable of providing data to the user. The HMI 1034 may also include input devices and controls such as an alphanumeric keyboard, a pointing device, keypads, pushbuttons, control knobs, microphones, etc., capable of accepting commands or input from the user and transmitting the entered input to the processor 1026.

A database 1044 may reside on the mass storage memory device 1030, and may be used to collect and organize data used by the various systems and modules described herein. database 140, object map 500, and object map 550 may be implemented using one or more databases, such as database 1044. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1026 may be used to access the information or data stored in records of the database 1044 in response to a query, where a query may be dynamically determined and executed by the operating system 1038, other applications 1040, or one or more modules.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed:

1. A method comprising:
   receiving a first access request identifying a protected resource from a client device, the first access request including an identifier;
   generating a user interface that includes a plurality of graphical objects for presentation at random locations on a display of the client device as defined by a first object map, wherein:
the plurality of graphical objects includes a set of user-defined objects associated with the identifier that define a graphical password based on a sequence-based criterion that specifies an order for selecting each user-defined object among the set of user-defined objects,
the graphical password is further defined by a behavior-based criterion that specifies a characteristic of an interaction for selecting at least one user-defined object among the set of user-defined objects,
each user-defined object among the set of user-defined objects shares a common visual attribute, and
the first object map comprises a graphical object display position mapping data that is stored and accessed at the user interface;
storing configuration information in the first object map that represents a location in which a display position of a particular graphical object within the user interface is mapped to that graphical object;
receiving input data including an input event for each interaction with the user interface that the client device detects, the input event for each interaction identifying a position on the display at which a corresponding interaction was detected;
determining, based on the input data, location data comprising a location of selected graphical objects of the plurality of graphical objects based on each position on the display;
determining that the location data of the input data satisfies the graphical password using the configuration information in the first object map; and
in response to determining that the input data satisfies the graphical password, granting access to the protected resource.

2. The method of claim 1, wherein the plurality of graphical objects further includes a null object and determining that the input data satisfies the graphical password using the first object map comprises:
evaluating the position on the display of each input event using the first object map; and
determining, based on the evaluated position of each input event, that each user-defined object defining the graphical password was selected without selecting the null object.

3. The method of claim 1, wherein the plurality of graphical objects further includes a null object, and determining that the input data satisfies the graphical password using the first object map comprises:
evaluating the position on the display of each input event using the first object map; and
determining, based on the evaluated position on the display of each input event, that each user-defined object defining the graphical password was selected in a specified order without selecting the null object.

4. The method of claim 1, further comprising:
receiving a second access request including the identifier; and
in response, generating a second interface that includes the set of user-defined objects for presentation at random positions on the display of the client device as defined by a second object map,
wherein the first object map and the second object map define different positions on the display for at least one user-defined object among the set of user-defined objects.

5. The method of claim 1, further comprising:
prior to granting access to the protected resource, activating a password input field of the user interface in response to determining that the input data satisfies the graphical password.

6. The method of claim 1, wherein at least one user-defined object among the set of user-defined objects is a custom object submitted by a user of the client device.

7. The method of claim 1, wherein at least one user-defined object among the set of user-defined objects includes image data obtained using an image sensor of the client device.

8. The method of claim 1, wherein at least one user-defined object among the set of user-defined objects is a template object selected from among a plurality of template objects stored on a host server.

9. The method of claim 1, wherein granting access to the protected resource includes:
sending an access token to the client device that the client device sends to a host server storing the protected resource.

10. The method of claim 1, wherein granting access to the protected resource includes:
generating a session in a memory space of a host server that enables the client device to access the protected resource.

11. A system comprising:
an electronic device with a display;
a processor; and
a computer-readable storage medium comprising instructions that upon execution
by the processor cause the system to perform operations, the operations
comprising:
sending an access request identifying a protected resource to an access service associated with a host server, the access request including an identifier;
in response, receiving a user interface from the access service that includes a plurality of graphical objects for presentation at random locations on the display as defined by a first object map, wherein:
the plurality of graphical objects includes a set of user-defined objects associated with the identifier that define a graphical password based on a sequence-based criterion that specifies an order for selecting each user-defined object among the set of user-defined objects,
the graphical password is further defined by a behavior-based criterion that specifies a characteristic of an interaction for selecting at least one user-defined object among the set of user-defined objects,
each user-defined object among the set of user-defined objects shares a common visual attribute,
the first object map comprises a graphical object display position mapping data that is stored and accessed at the user interface, and
configuration information is stored in the first object map that represents a location in which a display position of a particular graphical object within the user interface is mapped to that graphical object;
recording input data including an input event for each detected interaction with the user interface while presenting the user interface on the display, each input event identifying a position on the display at which a corresponding interaction was detected;

determining, based on the input data, location data comprising a location of selected graphical objects of the plurality of graphical objects based on each position on the display;

sending the location data of the input data including each recorded input event to the access service, wherein the access service determines whether the input data satisfies the graphical password using the configuration information in the first object map; and receiving access to the protected resource when the access service determines that the input data satisfies the graphical password using the first object map that defines randomly assigned positions for presenting the plurality of graphical objects on the display.

12. The system of claim 11, wherein the user interface includes a password input field in an inactive state, and wherein the instructions, when executed, further cause the system to perform additional operations, the additional operations comprising:

prior to receiving access to the protected resource, receiving data from the access service that transitions the password input field from the inactive state to an active state when the access service determines that the input data satisfies the graphical password.

13. The system of claim 11, wherein the access request further includes a password associated with the identifier, and the access service validates the password.

14. The system of claim 11, wherein the user interface is associated with an application executing on the host server.

15. The system of claim 11, wherein receiving access to the protected resource comprises:

receiving an access token from the access service for inclusion in subsequent requests sent to the host server.

16. The system of claim 11, wherein receiving access to the protected resource comprises:

receiving a session identifier from the access service corresponding to a session in a memory space of the host server that enables access to the protected resource.

17. A non-transitory computer-readable storage medium, storing program instructions that upon execution by a processor of a computing device, cause the computing device to perform operations comprising:

at an access service associated with a host server:

generating a user interface that includes a plurality of graphical objects for presentation at random locations on a display of a client device as defined by a first object map, wherein:

the plurality of graphical objects includes a set of user-defined objects associated with an identifier that define a graphical password based on a sequence-based criterion that specifies an order for selecting each user-defined object among the set of user-defined objects, the graphical password is further defined by a behavior-based criterion that specifies a characteristic of an interaction for selecting at least one user-defined object among the set of user-defined objects, each user-defined object among the set of user-defined objects share a common visual attribute, and the first object map comprises a graphical object display position mapping data that is stored and accessed at the user interface;

storing configuration information in the first object map that represents a location in which a display position of a particular graphical object within the user interface is mapped to that graphical object;

receiving input data including an input event for each interaction with the user interface that the client device detects, the input event for each interaction identifying a position on the display at which a corresponding interaction was detected;

determining, based on the input data, location data comprising a location of selected graphical objects of the plurality of graphical objects based on each position on the display;

determining that the location data of the input data satisfies the graphical password using the configuration information in the first object map; and in response to determining that the input data satisfies the graphical password, granting access to a protected resource.

* * * * *